United States Patent
Kline, III et al.

(10) Patent No.: US 9,420,776 B2
(45) Date of Patent: Aug. 23, 2016

(54) METHOD AND APPARATUS FOR TREATMENT OF TARGETED PLANTS

(75) Inventors: William N. Kline, III, Duluth, GA (US); Vernon Langston, The Woodlands, TX (US); Peter N. Scherer, Lebanon, IN (US)

(73) Assignee: Dow AgroSciences LLC, Indianapolis, IN (US)

( * ) Notice: Subject to any disclaimer, the term of this patent is extended or adjusted under 35 U.S.C. 154(b) by 743 days.

(21) Appl. No.: 13/286,622

(22) Filed: Nov. 1, 2011

(65) Prior Publication Data

US 2012/0150357 A1    Jun. 14, 2012

Related U.S. Application Data

(60) Provisional application No. 61/410,128, filed on Nov. 4, 2010.

(51) Int. Cl.
*G05D 7/06*     (2006.01)
*A01M 7/00*     (2006.01)

(52) U.S. Cl.
CPC ............ *A01M 7/0089* (2013.01); *A01M 7/0042* (2013.01)

(58) Field of Classification Search
CPC .......................... A01M 7/0082; A01M 7/0042
USPC ...................... 700/283, 277; 47/1.7
See application file for complete search history.

(56) References Cited

U.S. PATENT DOCUMENTS

| | | | |
|---|---|---|---|
| 4,208,835 A | | 6/1980 | Roll et al. |
| 5,222,324 A * | | 6/1993 | O'Neall et al. ................ 47/1.7 |
| 5,278,423 A | | 1/1994 | Wangler et al. |
| 5,296,702 A * | | 3/1994 | Beck et al. .................... 250/226 |
| 5,507,115 A | | 4/1996 | Nelson |
| 5,809,440 A * | | 9/1998 | Beck et al. ...................... 701/50 |
| 6,062,496 A * | | 5/2000 | Kinter .......................... 239/462 |
| 6,201,236 B1 * | | 3/2001 | Juds .............................. 250/221 |

(Continued)

FOREIGN PATENT DOCUMENTS

| | | |
|---|---|---|
| EP | 0722657 A1 | 7/1996 |
| EP | 1415535 A1 | 5/2004 |

(Continued)

OTHER PUBLICATIONS

Japanese Patent Publication No. JP 411116000A to Shiraiwa. English machine translation of JP 411116000A is included.*

(Continued)

*Primary Examiner* — Mohammad Ali
*Assistant Examiner* — Emilio J Saavedra
(74) *Attorney, Agent, or Firm* — Charles W. Amett; Faegre Baker Daniels LLP

(57) ABSTRACT

An apparatus for selectively treating plants is provided which may include a frame arranged to provide a plurality of horizontally spaced apart, non-overlapping treatment regions. Each treatment region may include at least one sensor which is arranged to monitor the respective treatment region for a plant to be treated. The apparatus may also include an electronic controller operatively coupled to the plurality of sensors and operatively coupled to a fluid delivery system. The electronic controller may control the fluid delivery system to deliver an application fluid through a respective application device when a targeted plant is detected in a respective treatment region.

27 Claims, 16 Drawing Sheets

(56) References Cited

U.S. PATENT DOCUMENTS

| | | |
|---|---|---|
| 6,209,257 B1 | 4/2001 | Nishimura |
| 6,444,975 B1 | 9/2002 | Reusch |
| 6,606,820 B2 * | 8/2003 | Nishimura ............ 47/1.7 |
| 6,698,668 B2 | 3/2004 | Stehling |
| 7,081,611 B2 | 7/2006 | Scott |
| 7,263,210 B2 | 8/2007 | Kümmel |
| 2004/0084551 A1 | 5/2004 | Vickers et al. |
| 2006/0086296 A1* | 4/2006 | Wichmann ............ 111/127 |
| 2008/0053669 A1* | 3/2008 | Hou ............ A01B 63/112 172/3 |
| 2009/0192654 A1 | 7/2009 | Wendte et al. |
| 2010/0014096 A1 | 1/2010 | Alameh |
| 2010/0179734 A1 | 7/2010 | Schumann |
| 2012/0010789 A1 | 1/2012 | Dulnigg |

FOREIGN PATENT DOCUMENTS

| | | |
|---|---|---|
| WO | WO9748497 A1 | 12/1997 |
| WO | WO9837977 A1 | 9/1998 |

OTHER PUBLICATIONS

Shrestha et al., "Video Processing for Early Stage Maize Plant Detection" Biosystems Engineering vol. 89, Issue 2, Oct. 2004, pp. 119-129.*

International Preliminary Report on Patentability and Written Opinion of the International Searching Authority for PCT/US2011/058794, May 7, 2013, 9 pgs.

International Search Report, in corresponding PCT/US2011/058794, Feb. 7, 2012, 5 pgs.

\* cited by examiner

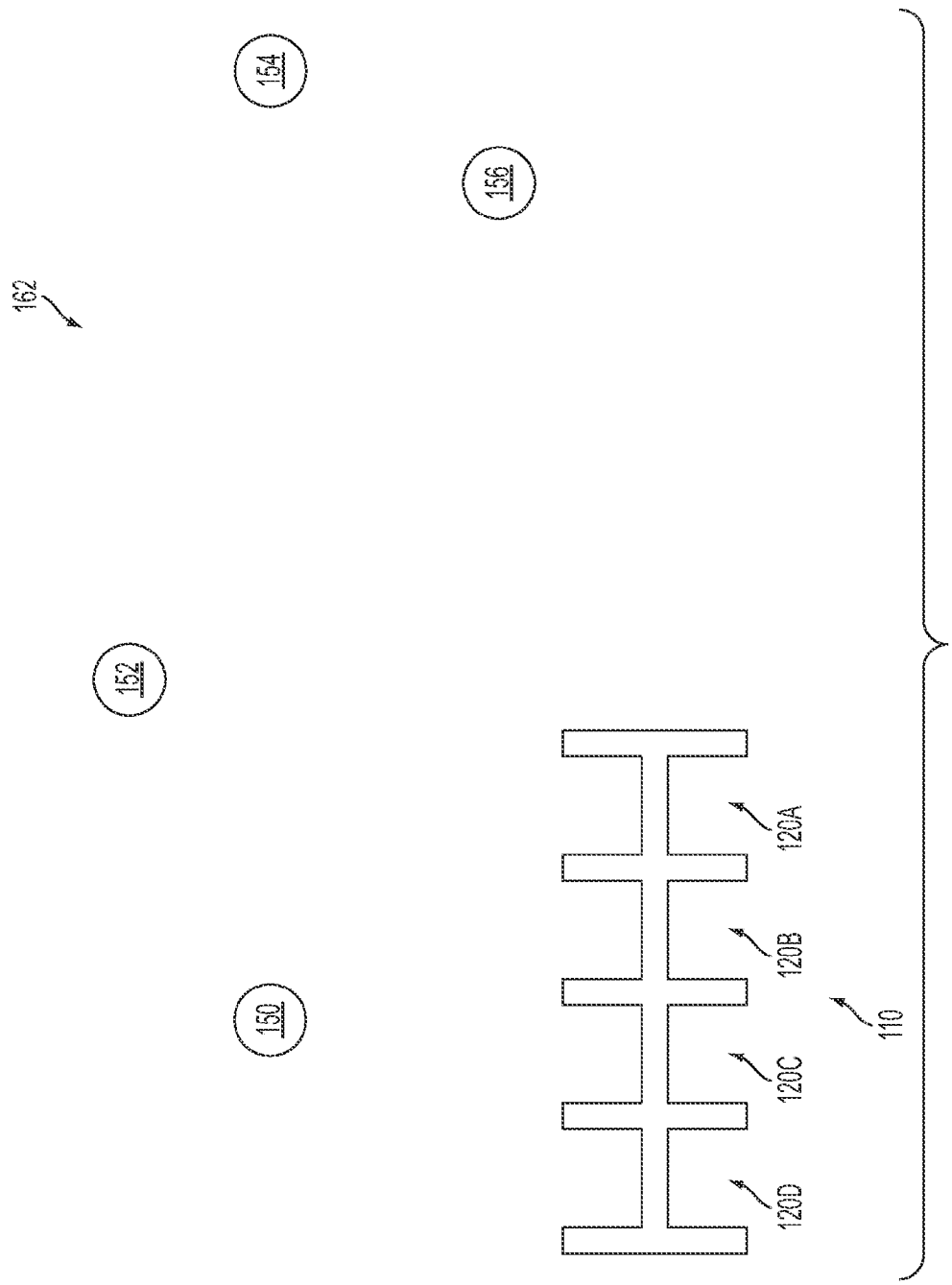

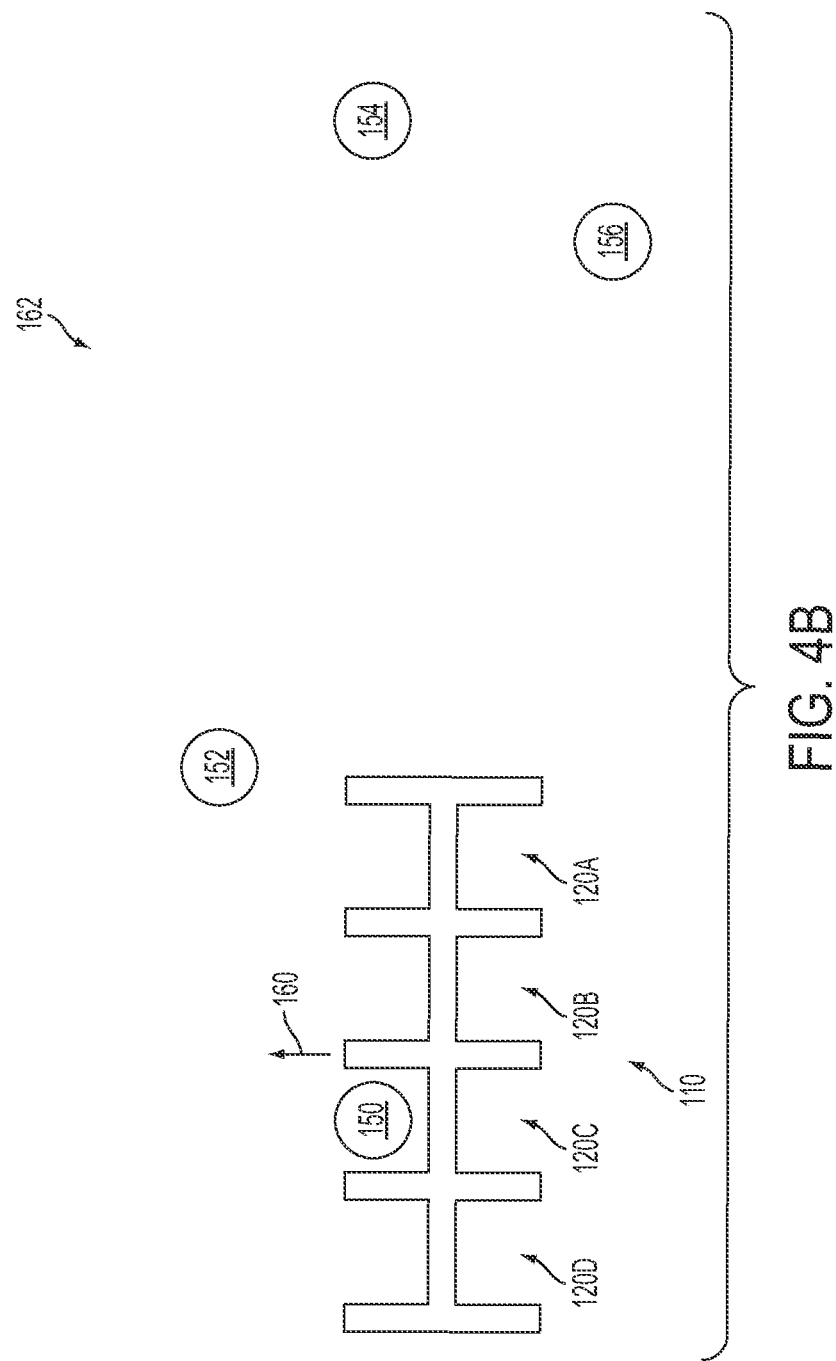

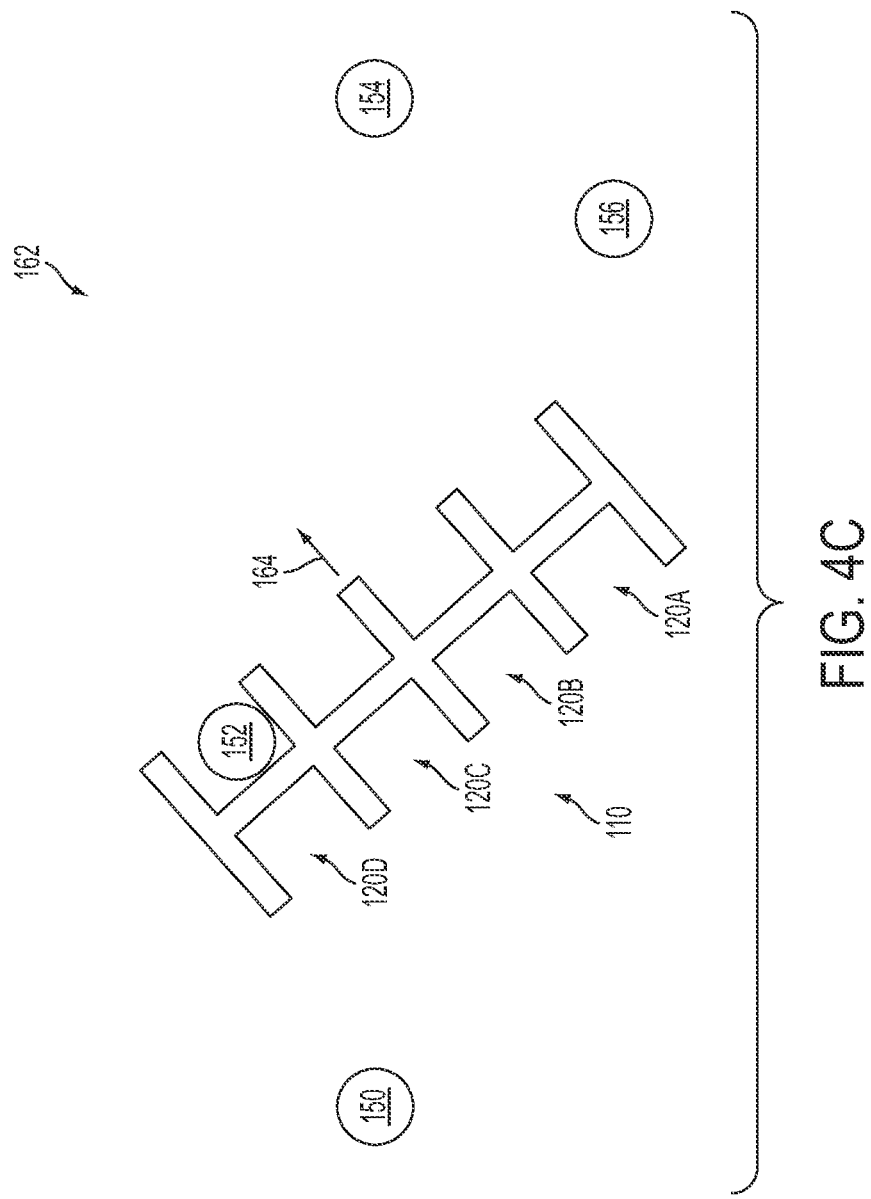

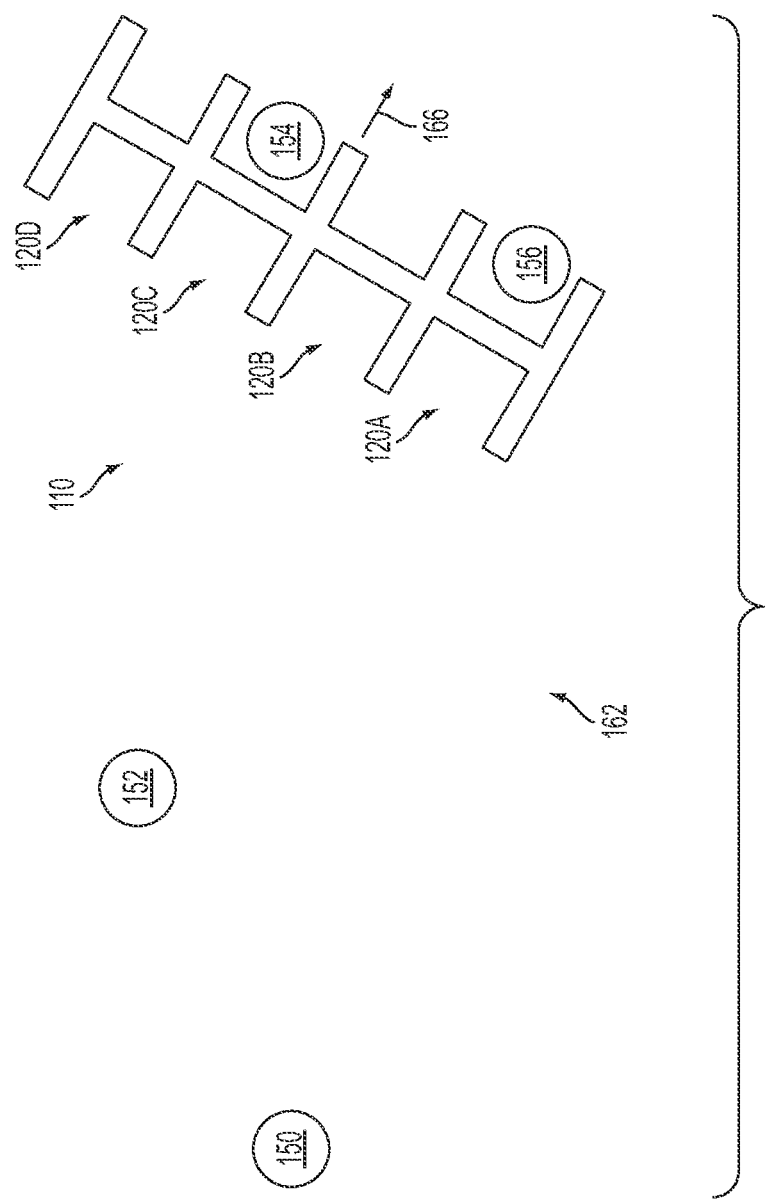

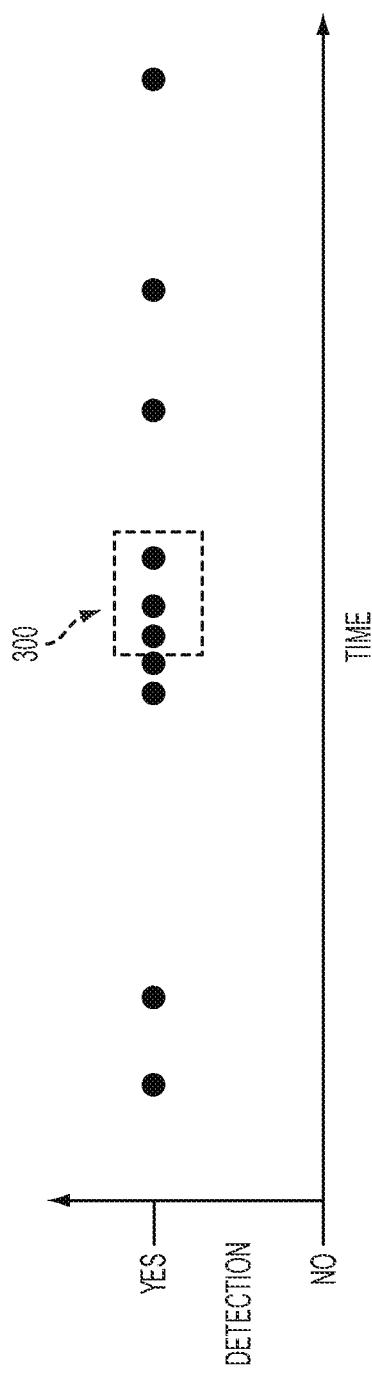
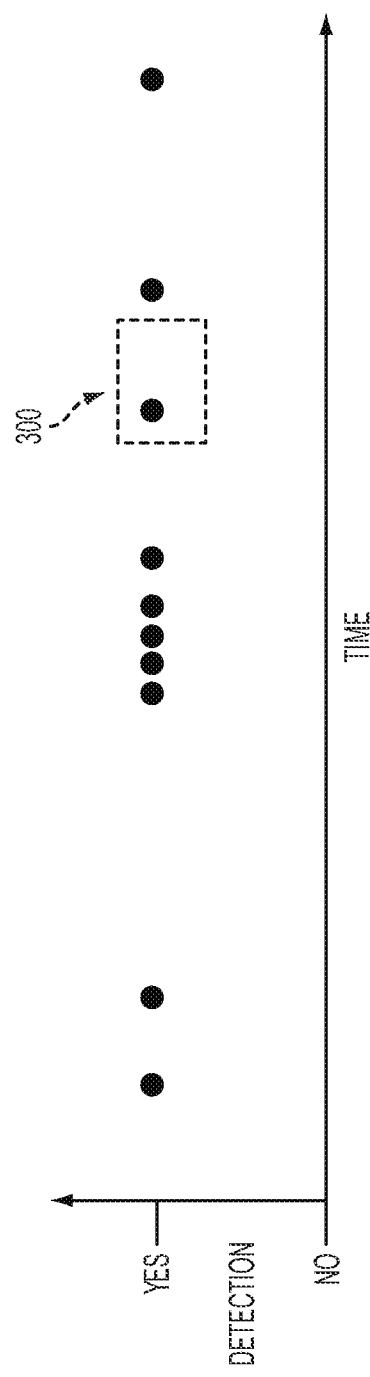

METHOD AND APPARATUS FOR TREATMENT OF TARGETED PLANTS

CROSS REFERENCE TO RELATED APPLICATIONS

This application claims the benefit of U.S. Provisional Patent Application Ser. No. 61/410,128 filed Nov. 4, 2010, which is expressly incorporated by reference herein.

FIELD

The present invention relates to methods and apparatus for treating targeted plants and in particular to methods and apparatus for selectively spraying herbicide and/or other application liquids on targeted plants to either foster the health of the targeted plants or to decrease the health of the targeted plants.

BACKGROUND AND SUMMARY

Devices are known which are used to treat plants. Exemplary devices include sprayers which cover an area with a herbicide or other liquid. The liquid being sprayed on all plants.

In an exemplary embodiment of the present disclosure, an apparatus for treating targeted plants with an application liquid is disclosed. In another exemplary embodiment of the present disclosure, a method for treating targeted plants with an application liquid is disclosed. In a further exemplary embodiment of the present disclosure, a sensor system is disclosed.

In another exemplary embodiment of the present disclosure, an apparatus for selectively treating plants is provided. The apparatus comprising a frame arranged to provide a plurality of horizontally spaced apart, non-overlapping treatment regions. The frame separating the plurality of horizontally spaced apart, non-overlapping treatment regions. The apparatus further comprising a plurality of sensors, each treatment region including at least one sensor which is arranged to monitor the respective treatment region for a plant to be treated; a fluid delivery system including a plurality of application devices, each treatment region including at least one application device; and an electronic controller operatively coupled to the plurality of sensors and operatively coupled to the fluid delivery system, for each treatment region the electronic controller controlling the fluid delivery system to deliver an application fluid through the respective application device when a targeted plant is detected in the respective treatment region. In one example, a first frame portion divides a first treatment region of the plurality of treatment regions from a second treatment region of the plurality of treatment regions and a second frame portion divides the second treatment region from a third treatment region. In a variation of the example, the first treatment region includes a first application device and the second treatment region includes a second application device, the first frame member and the second frame member being arranged to prevent application fluid which is delivered through the second application device from entering the first treatment region and the third treatment region. In another example, the electronic controller determines a presence of the targeted plant in the respective treatment region based on a detection algorithm which evaluates historical sensor reading related to the respective treatment region. In yet another example, the electronic controller determines a presence of the targeted plant in the respective treatment region based on a longitudinal width of a detected object. In still another example, the plurality application devices are spray nozzles. In yet still another example, the frame includes a plurality of frame members which define a base frame, a first door supported by the base frame and bounding a first side of a first treatment region, a second door supported by the base frame and bounding a side of the first treatment region, the first treatment region being bounded by the base frame, first door, and second door. In a variation of the example, the first door includes a first door aperture through which a first sensor monitors the first treatment region. In a further variation thereof, the first door includes a first side and a second side, the apparatus further comprising a positive pressure system in fluid communication with a first side of the first door, the positive pressure system providing a flow of fluid which passes from the first side of the first door through the first door aperture to the second side of first door to reduce the entrance of particulate matter through the first door aperture. In yet still a further example, the application fluid is a liquid. In a further example, each treatment region includes at least two application devices, a first application device positioned lower than the second application device such that the first application device targets a base portion of the targeted plant and the second application device targets a leafy portion of the targeted plant. In a variation of the example, the apparatus further comprises an operator interface providing an indication when the targeted plant is detected in the respective treatment region. In a further variation thereof, the operator interface includes at least one input, based on the at least one input the electronic controller activates one of the first application device of the respective treatment region, the second application device of the respective treatment region, and both the first application device of the respective treatment region and the second application device of the respective treatment region when the targeted plant is detected in the respective treatment region. In another variation thereof, the operator interface includes a first input which causes the electronic controller to control the fluid delivery system to delivery the application fluid through the plurality of application devices.

In a further exemplary embodiment of the present disclosure, an apparatus for selectively treating plants is provided. The apparatus comprising a frame including a housing having an aperture; at least one sensor supported by the frame, the at least one sensor monitoring a treatment region for a targeted plant through the aperture in the housing; a positive pressure system in fluid communication with an interior of the housing, the positive pressure system providing a flow of fluid which enters the interior of the housing and exits the interior of the housing through the aperture in the housing to reduce the entrance of particulate matter into the interior of the housing through the aperture; a fluid delivery system including at least one application device positioned to treat the targeted plant with an application fluid; and a controller operatively coupled to the at least one sensor and operatively coupled to the fluid delivery system. The controller controlling the fluid delivery system to deliver the application fluid through the at least one application device in response to the targeted plant being detected in the treatment region. In an example, the frame is arranged to provide a plurality of horizontally spaced apart, non-overlapping treatment regions, the frame separating the plurality of horizontally spaced apart, non-overlapping treatment regions.

In still a further exemplary embodiment of the present disclosure, an apparatus for selectively treating plants is provided. The apparatus comprising a frame arranged to provide a plurality of horizontally spaced apart, non-overlapping treatment regions; sensing means for monitoring the respective treatment regions for a plant to be treated; fluid delivery means for treating the plant to be treated with at least one application device; and control means for controlling the fluid delivery means based on an output of the sensing means. In an example, the frame separates the plurality of horizontally spaced apart, non-overlapping treatment regions. In another example, the sensing means includes optical sensors. In a variation thereof, the apparatus further comprises a positive pressure system to reduce contact of particulate matter on the optical sensors.

In yet still a further exemplary embodiment of the present disclosure, a method for selectively treating targeted plants is provided. The method comprising the steps of advancing a plurality of horizontally spaced apart, non-overlapping treatment regions in a predetermined direction, each treatment region bounded by at least two frame members of a frame; causing a plant to enter one of the plurality of treatment regions; detecting the plant with at least a first sensor supported by the frame; and determining whether the plant satisfies a predetermined criteria for treatment and if the plant satisfies the predetermined criteria for treatment spraying the plant with an application fluid through at least one application device supported by the frame. In an example, the step of determining whether the plant satisfies the predetermined criteria for treatment includes evaluating historical sensor readings for the first sensor. In another example, the step of determining whether the plant satisfies the predetermined criteria for treatment includes storing a plurality of sensor reading for the first sensor, each sensor reading corresponding to a respective time value, and classifying the plant as satisfying the predetermined criteria if the plurality of sensor readings satisfy at least one condition. In a variation thereof, each sensor reading is classified as either indicative of the presence of an object or indicative of the absence of an object and the at least one condition is satisfied if a threshold number of sensor readings are classified as indicative of the presence of the object. In still another example, the predetermined criteria is whether a width of the plant exceeds a threshold value. In yet still another example, the predetermined criteria is whether a height of the plant exceeds a threshold value.

The above and other features of the present disclosure, which alone or in any combination may comprise patentable subject matter, will become apparent from the following description and the attached drawings.

BRIEF DESCRIPTION OF THE DRAWINGS

The detailed description particularly refers to the following figures, in which:

FIG. 4A illustrates the treatment regions of the treatment apparatus in a first position within a pasture area having a plurality of targeted plants;

FIG. 4B illustrates the treatment regions of the treatment apparatus in a second position within a pasture area having a plurality of targeted plants;

FIG. 4C illustrates the treatment regions of the treatment apparatus in a third position within a pasture area having a plurality of targeted plants;

FIG. 4D illustrates the treatment regions of the treatment apparatus in a fourth position within a pasture area having a plurality of targeted plants;

FIGS. 12A-D illustrate an exemplary detection algorithm of the controller.

Corresponding reference characters indicate corresponding parts throughout the several views.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

Figure 1:
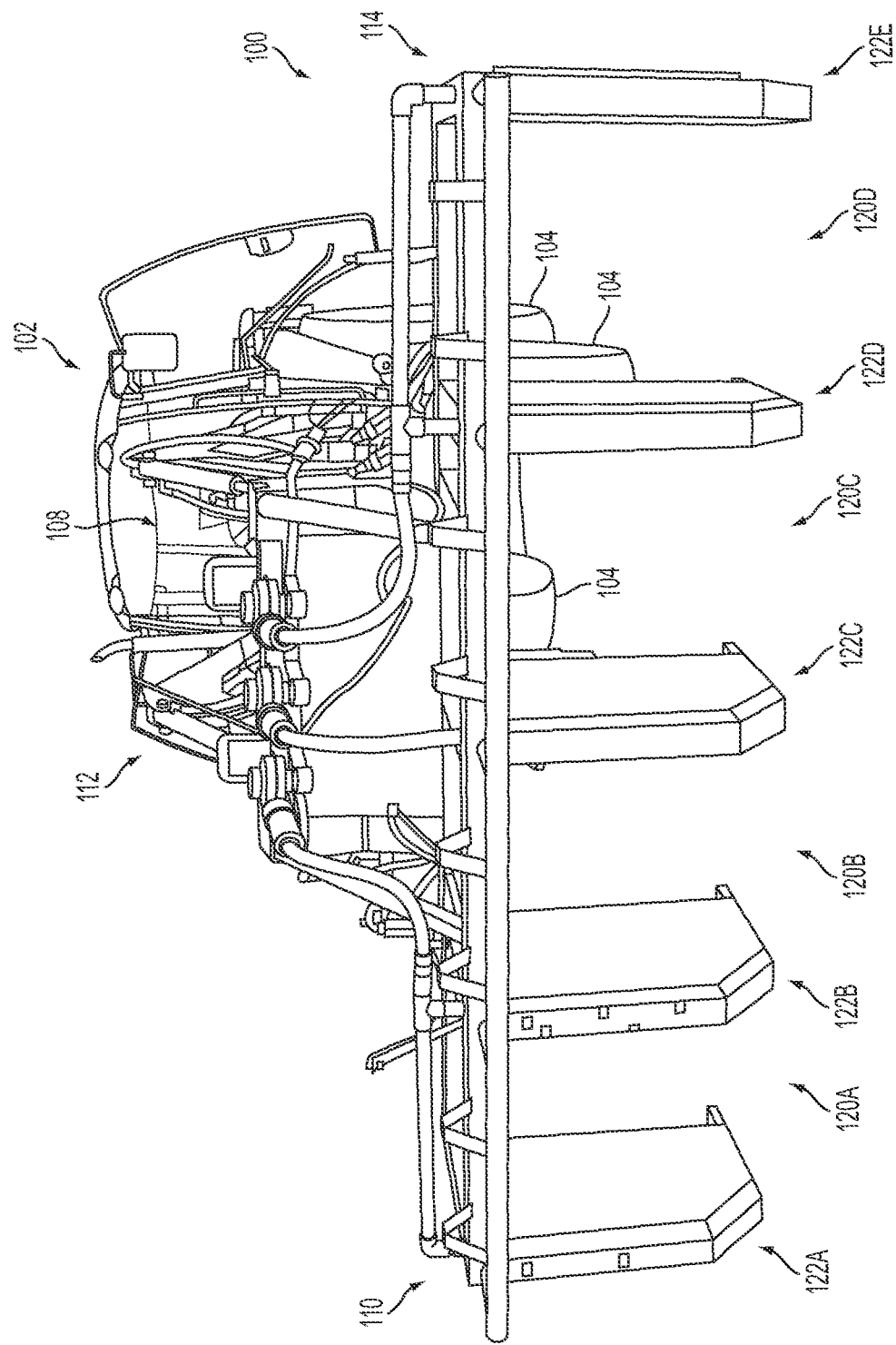
FIG. 1 illustrates a front, perspective view of an exemplary treatment apparatus coupled to a vehicle.
Figure 2:
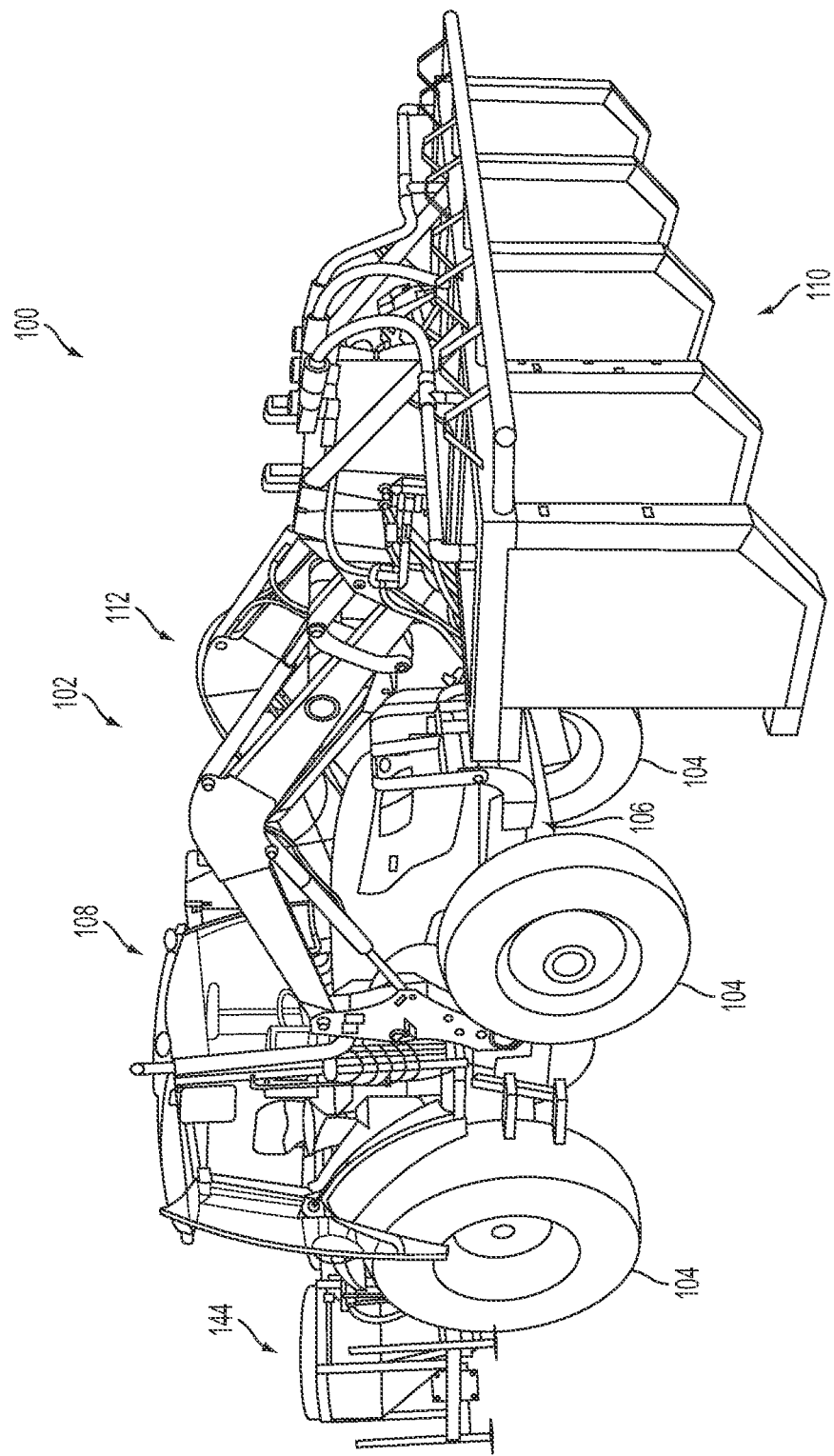
FIG. 2 illustrates the treatment apparatus of FIG. 1.

Referring to FIGS. 1 and 2, an exemplary treatment apparatus 100 is shown. Treatment apparatus 100 is coupled to a vehicle 102. Exemplary vehicles include tractors, ATVs, utility vehicles, and any other suitable types of vehicles. Illustratively vehicle 102 is a tractor having a plurality of ground engaging members 104, a frame 106, and an operator area 108. Vehicle 102 includes a power source, such as an internal combustion engine, which is used to power movement of vehicle 102 relative to the ground.

Treatment apparatus 100 includes an application apparatus 110 which is coupled to moveable arms 112 of vehicle 102. Referring to FIG. 1, application apparatus 110 includes a frame 114 which defines four spaced-apart treatment regions 120. Each of treatment regions 120 are separated by respective frame members 122. In the illustrated embodiment four treatment regions 120 are provided: treatment region 120A which is bounded by frame member 122A and frame member 122B, treatment region 120B which is bounded by frame member 122B and frame member 122C; treatment region 120C which is bounded by frame member 122C and frame member 122D, and treatment region 120D which is bounded by frame member 122D and frame member 122E. In one embodiment, at least two treatment regions are provided.

Figure 3:
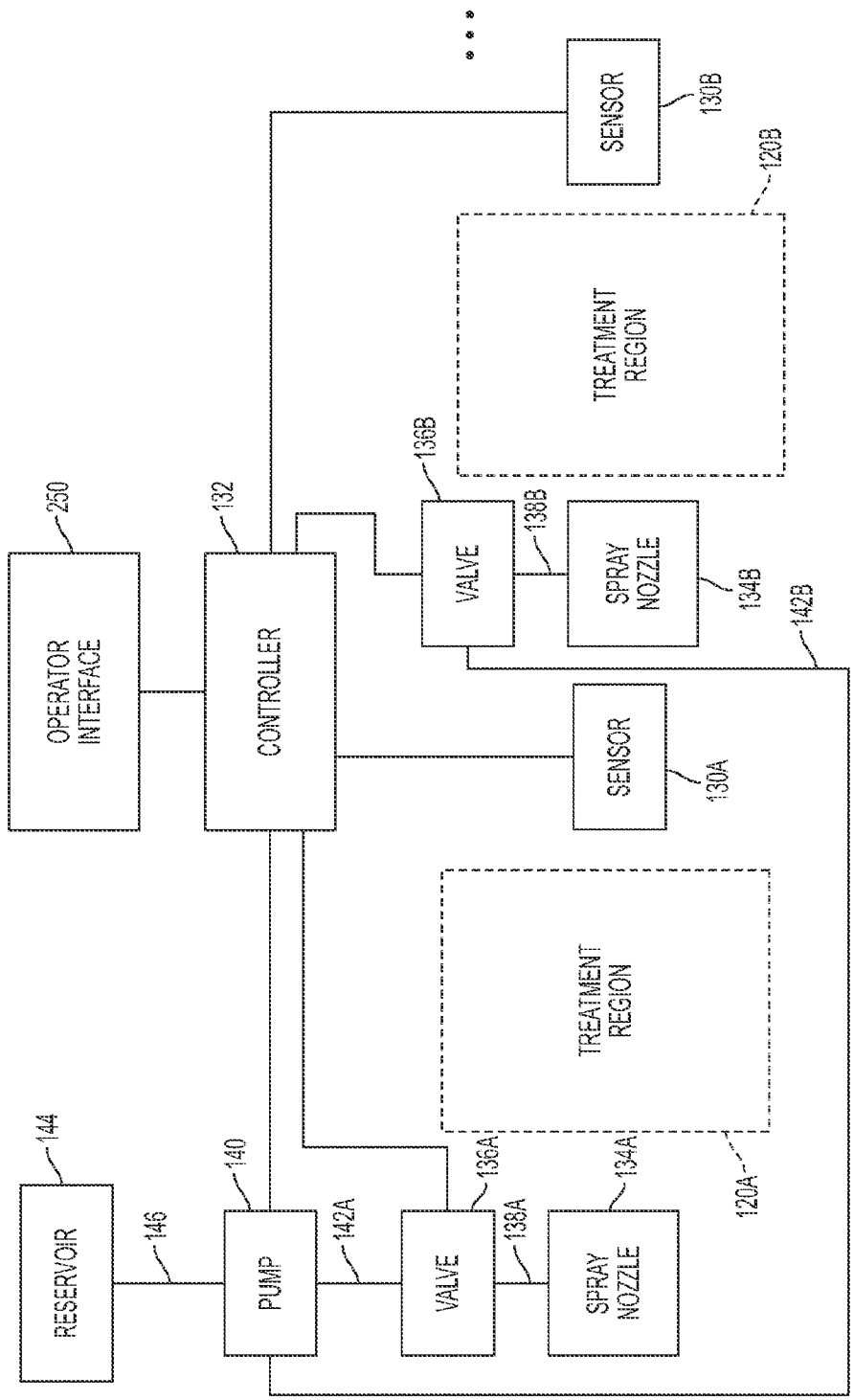
FIG. 3 illustrates a representation of components of the treatment system of FIG. 1.

Referring to FIG. 3, a portion of treatment apparatus 100 is represented. Each treatment region 120 (treatment region 120A and treatment region 120B being shown) include at least one sensor 130 which provides an indication of the presence or absence of an object in the treatment regions 120. Sensors 130 are operatively coupled to an electronic controller 132. As explained in more detail herein electronic controller 132 executes software which based on the output of sensors 130 decides if a targeted plant is present in a respective treatment regions 120 which needs to be sprayed with an application fluid. Exemplary application fluids include herbicides, insecticides, fungicides, plant growth regulators, or other application liquids. Although the disclosed embodiment provides software, the logic disclosed herein may be performed through a hardware implementation.

Figure 6:
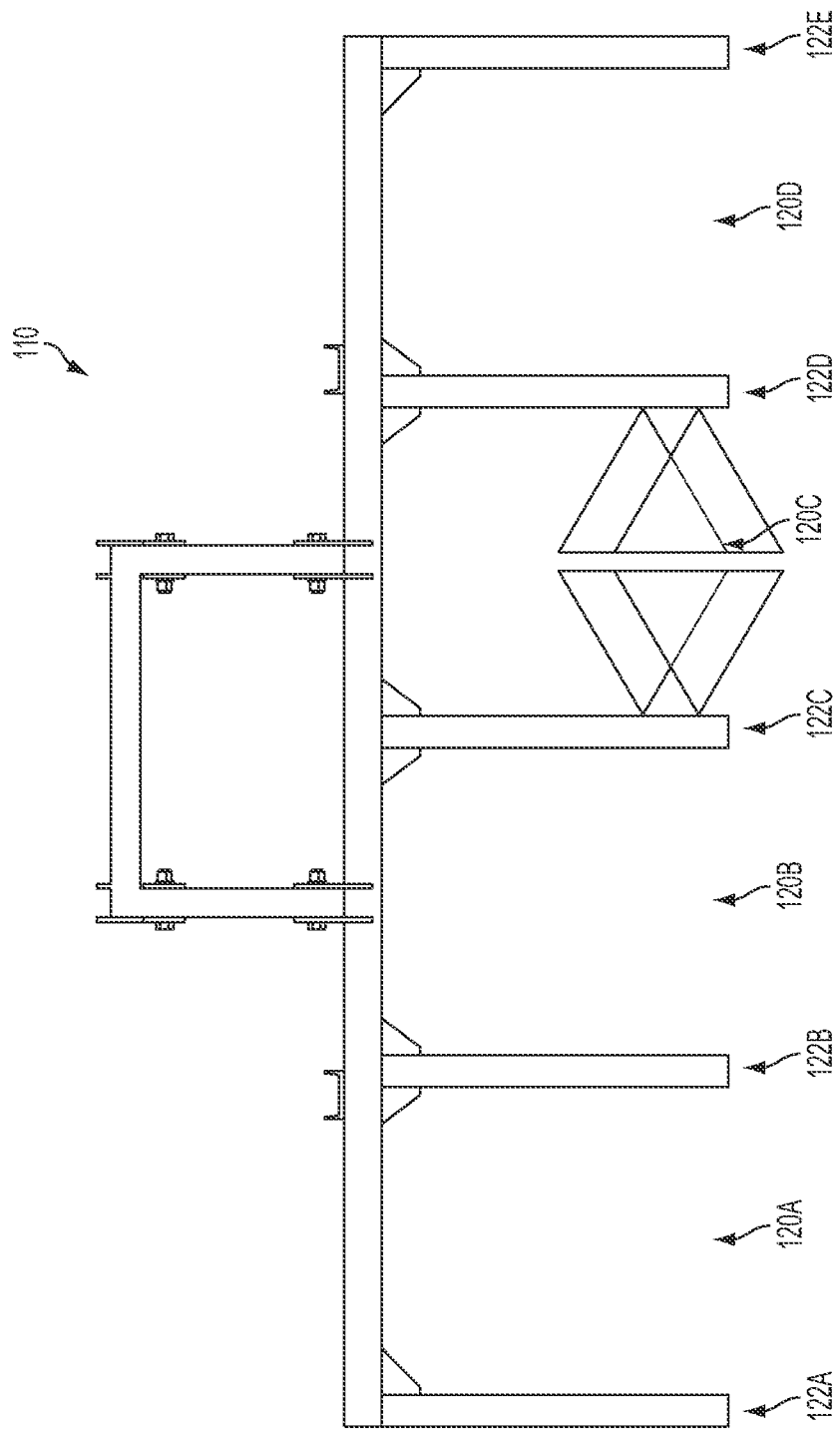
FIG. 6 illustrates an exemplary spray configuration for a treatment region of the treatment apparatus of FIG. 1.
Figure 7:
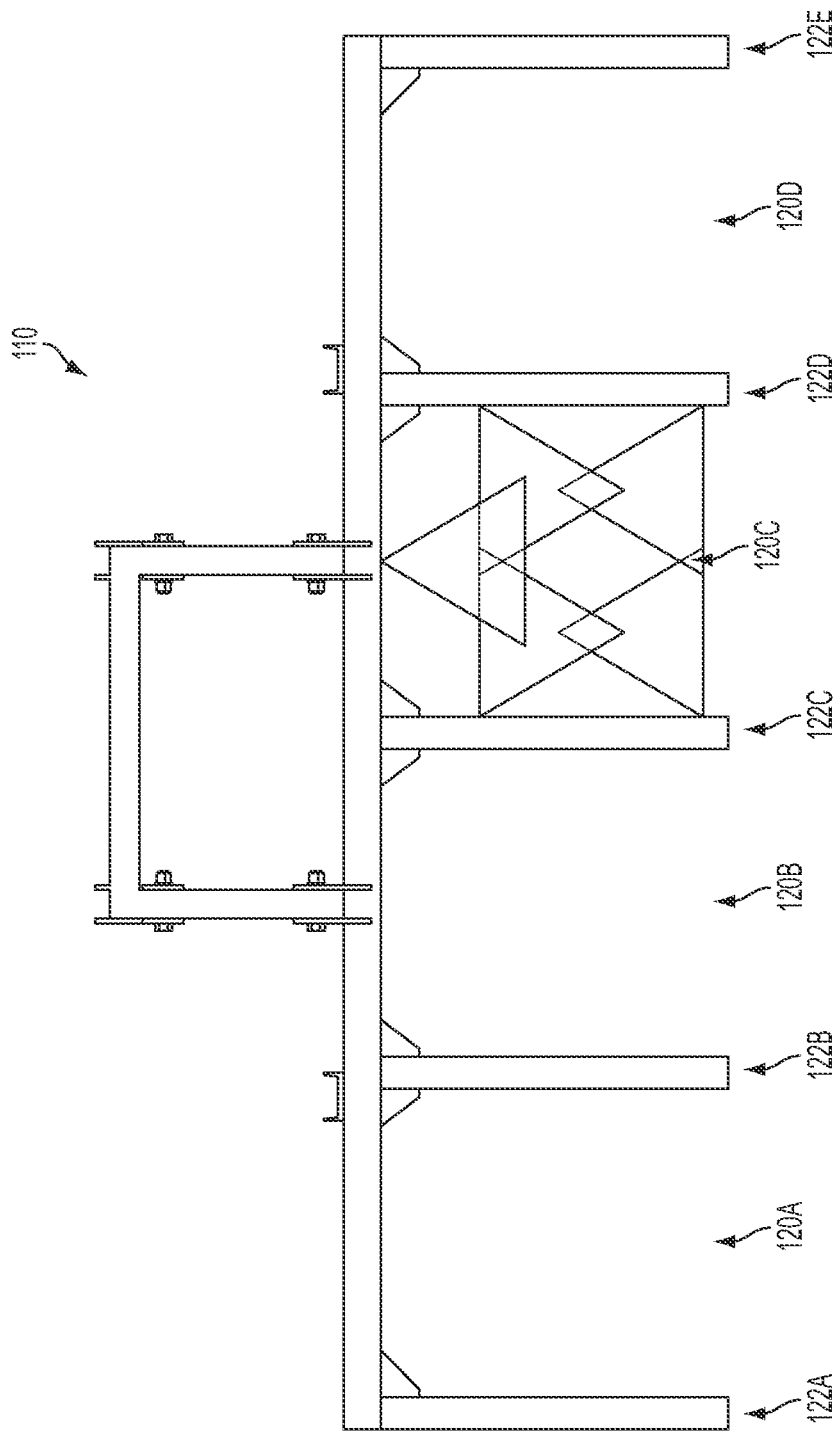
FIG. 7 illustrates another exemplary spray configuration for a treatment region of the treatment apparatus of FIG. 1.

Each treatment region 120 further includes at least one application device, illustratively a spray nozzle 134 which directs the application liquid toward a portion of the respective treatment region 120. The spray cones for exemplary positions of spray nozzles in treatment region 120C are shown in FIG. 6 and FIG. 7.

Each spray nozzle 134 is coupled to a solenoid valve 136 through a fluid conduit 138. In one embodiment, a valve 136 is provided for each spray nozzle 134. In one embodiment, at least two spray nozzles 134 are coupled to a common solenoid valve 136 through one of a series connection and a parallel connection. Each solenoid valve 136 is coupled to a pump 140 through a respective fluid conduit 142. In one embodiment, solenoid valves 136 are coupled to pump 140 in parallel through a manifold. Pump 140 is, in turn, coupled to a reservoir 144 through fluid conduit 146. In the illustrated embodiment in FIG. 2, reservoir 144 is supported by vehicle 102 from a rear of vehicle 102.

Each solenoid valve 136 is operatively coupled to electronic controller 132 which controls whether the respective solenoid valve 136 is in an open state or a closed state. In the open state, a solenoid valve 136 permits the communication of the application fluid from the respective fluid conduit 142 to the respective fluid conduit 138 and onto the respective spray nozzle 134. In the closed state, a solenoid valve 136 blocks the communication of the application fluid from the respective fluid conduit 142 to the respective fluid conduit 138 and onto the respective spray nozzle 134.

By having multiple treatment regions 120, the application of an application liquid may be generally tailored to the plant that is being targeted as opposed to the application of the application liquid to generally all of the plants. Further, the multiple treatment regions 120 provides the ability to cover a given ground area in a shorter amount of time. Referring to FIGS. 4A-4D, a representation of the treatment of plants 150-156 with treatment apparatus 100 is illustrated. Referring to FIG. 4A, application apparatus 110 is shown with treatment regions 120A-D.

The operator of vehicle 102 wants to apply an application liquid to plants 150-156. The operator of vehicle 102 advances vehicle 102 and hence application apparatus 110 in direction 160, see FIG. 4B, causing plant 150 to enter treatment region 120C wherein it is detected and sprayed with the application liquid while plants 152-156 and the ground 162 outside of treatment region 120C are generally not sprayed with the application liquid. Referring to FIG. 4C, the operator of vehicle 102 turns and advances vehicle 102 and hence application apparatus 110 in direction 164 causing plant 152 to enter treatment region 120D wherein it is detected and sprayed with the application liquid while the remaining plants and the ground 162 outside of treatment region 120D are generally not sprayed with the application liquid. Referring to FIG. 4D, the operator of vehicle 102 turns and advances vehicle 102 and hence application apparatus 110 in direction 166 causing plant 156 to enter treatment region 120A wherein it is detected and sprayed with the application liquid and causing plant 154 to enter treatment region 120C wherein it is detected and sprayed with the application liquid while the remaining plants and the ground 162 outside of treatment regions 120A and 120C are generally not sprayed with the application liquid.

Figure 8:
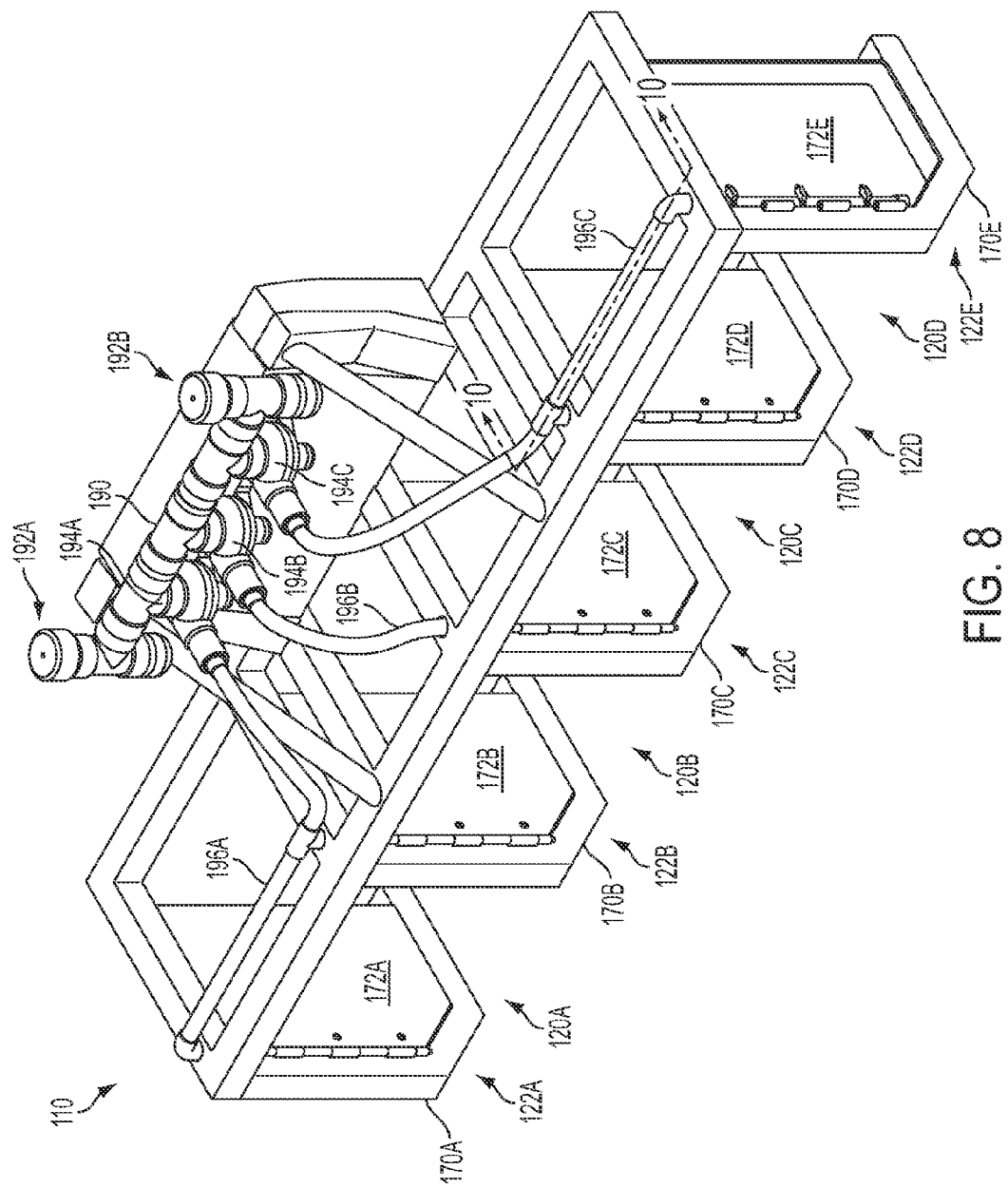
FIG. 8 illustrates a portion of the treatment apparatus of FIG. 1.
Figure 9:
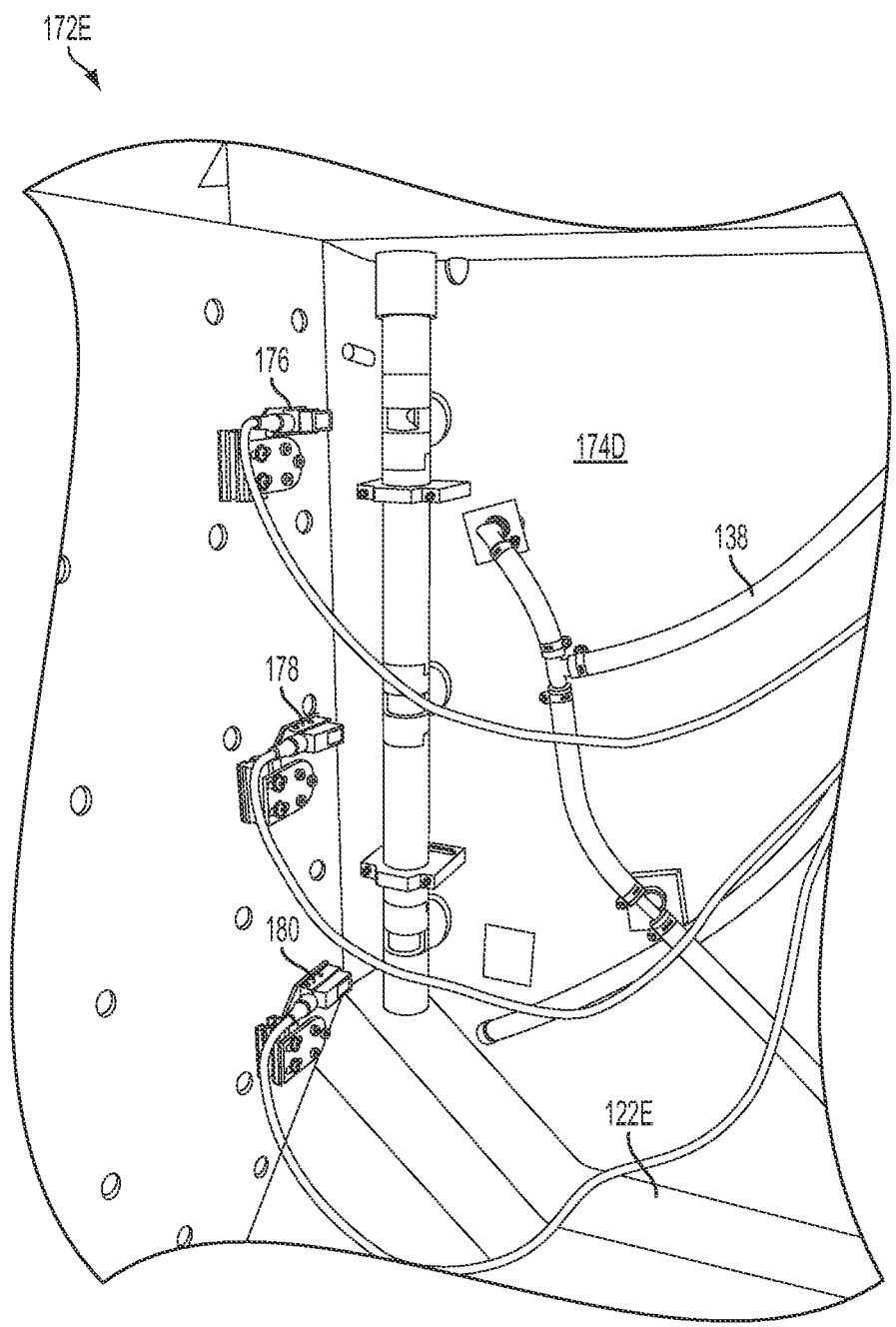
FIG. 9 illustrates a view of a sensor arrangement for a portion of the treatment apparatus of FIG. 1.
Figure 10:
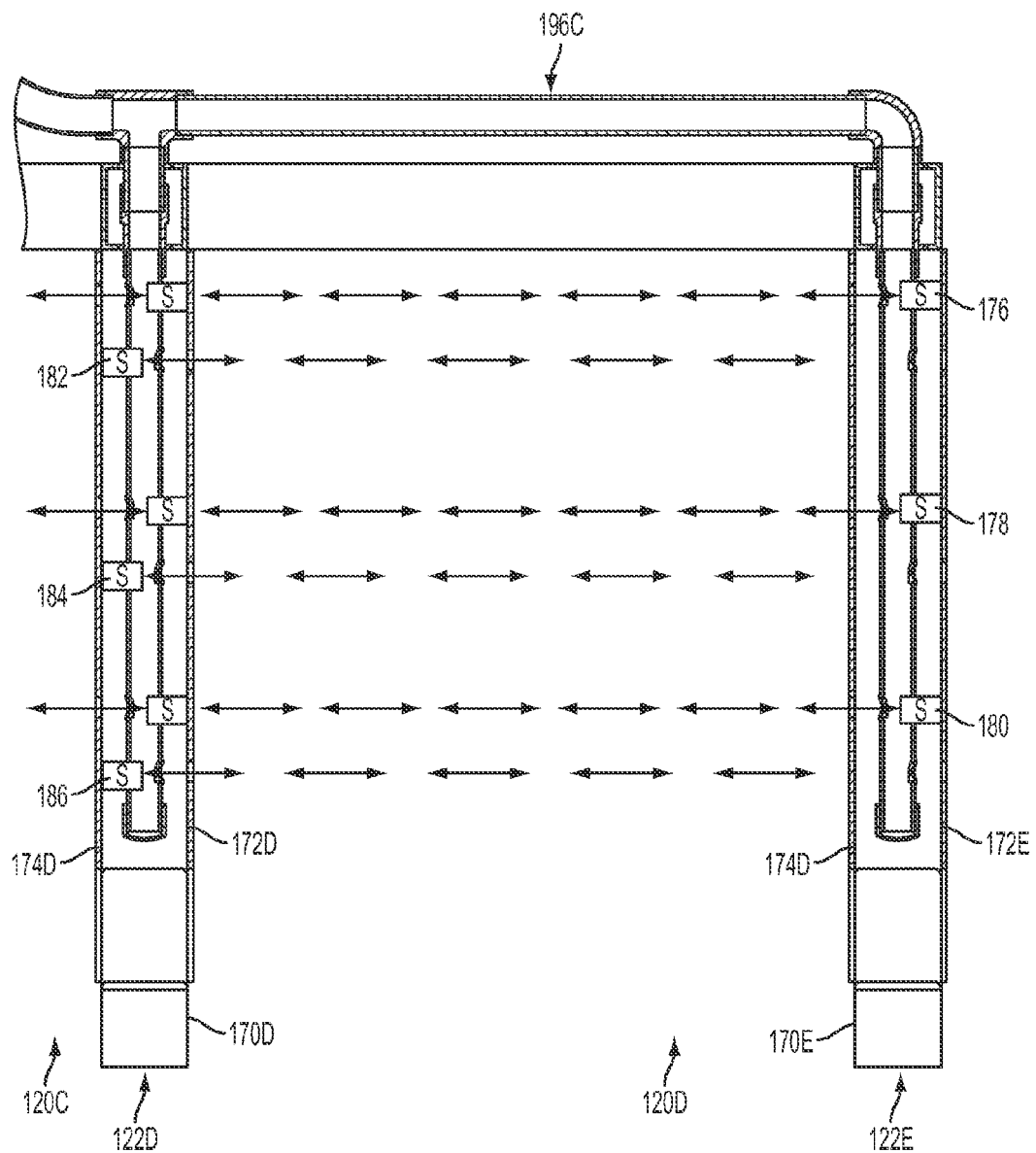
FIG. 10 illustrates a sectional view along lines 10-10 in FIG. 8.

Referring to FIG. 8, application apparatus 110 is shown. Each of frame members 122 includes a base frame 170, a first door 172, and a second door 174 (see FIG. 10). Referring to FIG. 9, door 172E for treatment region 120D supports three sensors 176, 178, and 180. In a similar fashion, as shown in FIG. 10, door 174D for treatment region 120D supports three sensors 182, 184, and 186. In the illustrated embodiment, each of sensors 176-186 is an optical sensor which emits a beam of optical radiation through an aperture in the respective frame members 122 and into treatment region 120D. For sensors 176-180, the emitted optical energy, if not blocked by an object in treatment region 120D, is reflected by a retroreflector attached to door 172D and returned to a sensing element of the respective sensor for detection. For sensors 182-186, the emitted optical energy, if not blocked by an object in treatment region 120D, is reflected by a retroreflector attached to door 174E and returned to a sensing element of the respective sensor for detection.

Although optical sensors are illustrated other types of sensors which provide an indication of the presence of an object in the treatment region 120D may be used. Exemplary sensors include optical sensors, ultrasound sensors, limit switches, position sensors, force sensors, and other suitable sensor technology to detecting the presence of an object in a treatment region. In one embodiment, the sensors are spring mounted.

As application apparatus 110 is moved around by vehicle 102, dust and other small particulate matter tends to be transported by the air. This particulate matter may attach to the window of any one of the sensors 176-186 resulting in the reliability of the respective sensor being diminished. In order to minimize the contamination of the sensors with particulate matter a positive pressure system 190 is used.

Figure 11:
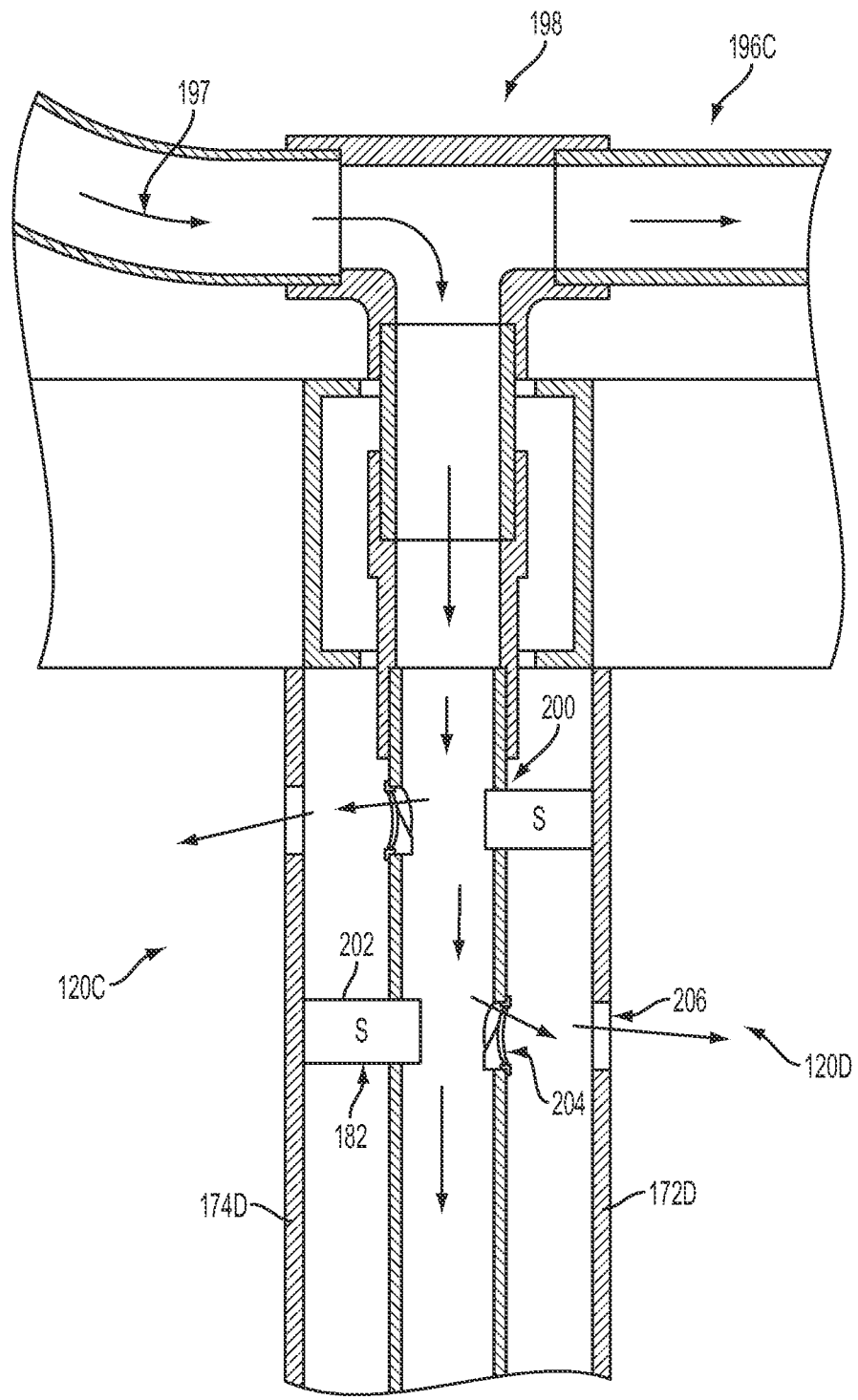
FIG. 11 illustrates an enlargement of a portion of FIG. 10.

Positive pressure system 190 includes a pair of air intakes 192 having associated filters that incoming air passes through. The air is pumped by a plurality of air pumps 194 through fluid conduits 196. Referring to FIG. 11, the air stream 197 passes into fluid conduits 200 within the respective frame member 122 through a T-coupler 198. By way of example, a window 202 of sensor 182 is shown extending into fluid conduit 200 when door 174D is closed. The air stream 197 exits fluid conduit 200 through an aperture 204 in fluid conduit 200 and an aperture 206 in door 172D. This flow of air outward towards treatment region 120D reduces the likelihood that particulate matter from treatment region 120D may reach window 202 of sensors 182.

Figure 5:
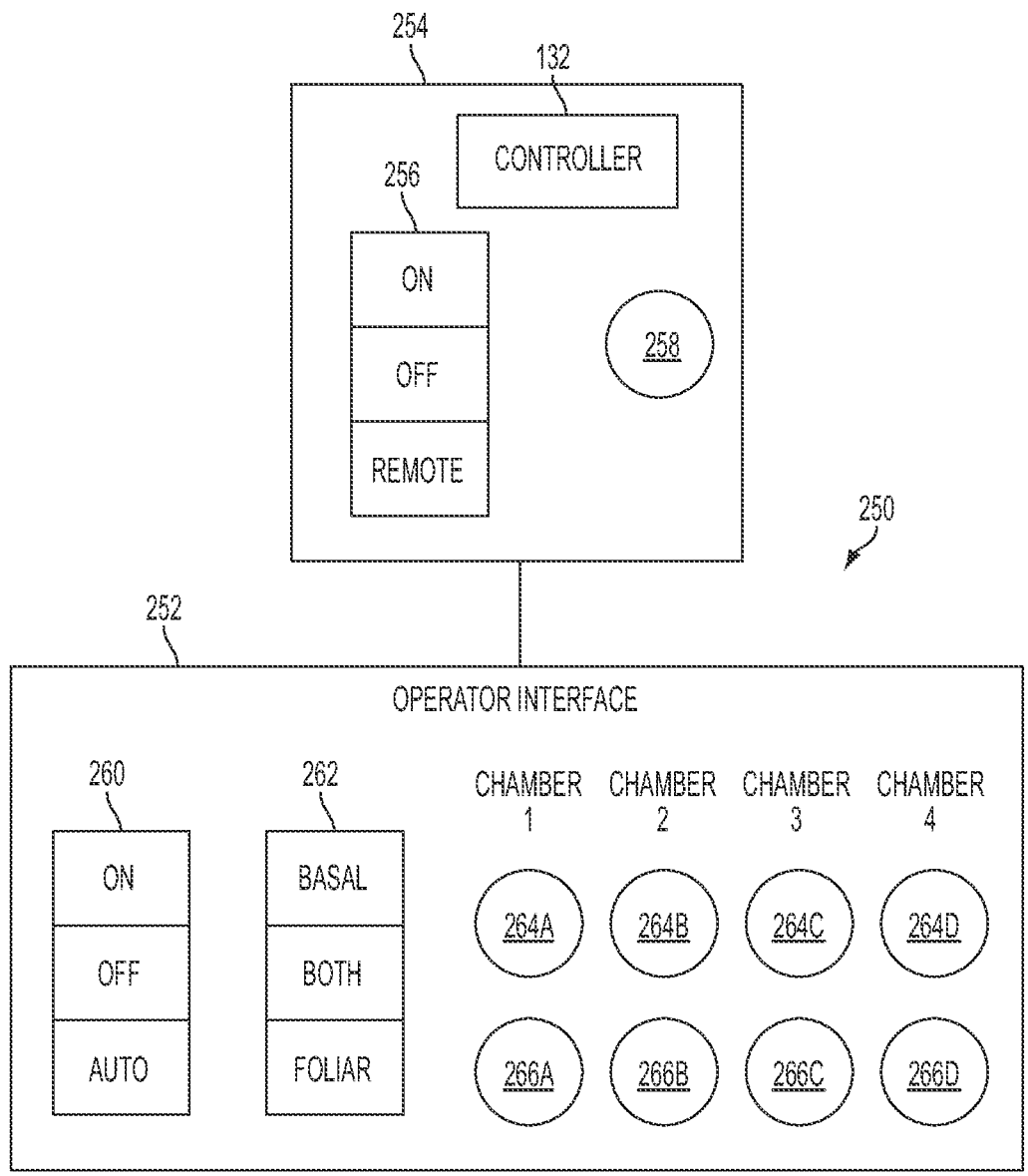
FIG. 5 illustrates a representation of a control unit and operator interface of the treatment apparatus of FIG. 1.

Referring to FIG. 5, an exemplary operator interface 250 is shown. In one embodiment, operator interface 250 is integrated into an operator interface of treatment apparatus 100. In one embodiment, operator interface 250 is provided as a stand alone device 252 which may be positioned in operator area 108 and coupled to vehicle 102. In a similar way, the functionality of electronic controller 132 may be provided as part of a controller of vehicle 102 or as a stand alone device 254 which may be positioned in operator area 108 of vehicle 102 and coupled to vehicle 102. In one embodiment, stand alone device 252 and stand alone device 254 may be incorporated into a single stand alone device.

In the illustrated embodiment, treatment apparatus 100 may operate without stand alone device 252. In this embodiment, stand alone device 254 includes a user input 256 and an indicator light 258. In one embodiment, user input 256 is a three position switch having an ON position (activating treatment apparatus 100), an OFF position (deactivating treatment apparatus 100), and a REMOTE position (delegating control to the operator interface 250 of stand alone device 252). Indicator light 258 is illuminated when a plant designated for spraying is detected in one of the treatment regions 120.

When activation control is delegated to operator interface 250 of stand alone device 252, the user inputs of operator interface 250 control the operation of electronic controller 132. In the illustrated embodiment, operator interface 250 includes a first user input 260. In one embodiment, user input 260 is a three position switch having an ON position (opening all of valves 136), a OFF position (closing all of valves 136), and an AUTO position (activating the spray nozzles for a treatment region based on the detection of a targeted plant).

Operator interface 250 further includes a second user input 262. In one embodiment, user input 262 is a three position switch having a BASAL position (limiting spray nozzles to the ground region of the treatment region 120), a FOLIAR position (limiting the spray nozzles to the leafy portion of the plant in the treatment region), and a BOTH position (activating all spray nozzles for a treatment region). Operator interface 250 further includes a plurality of indicator lights 264, one for each treatment region. The respective indicator light 264 is illuminated when a plant designated for spraying is detected in the respective treatment region 120. Operator interface 250 also includes a manual activation button 266 for each treatment region. By depressing one of the activation buttons 266, controller 132 activates the spray nozzles for the corresponding treatment region 120.

Figure 12A:
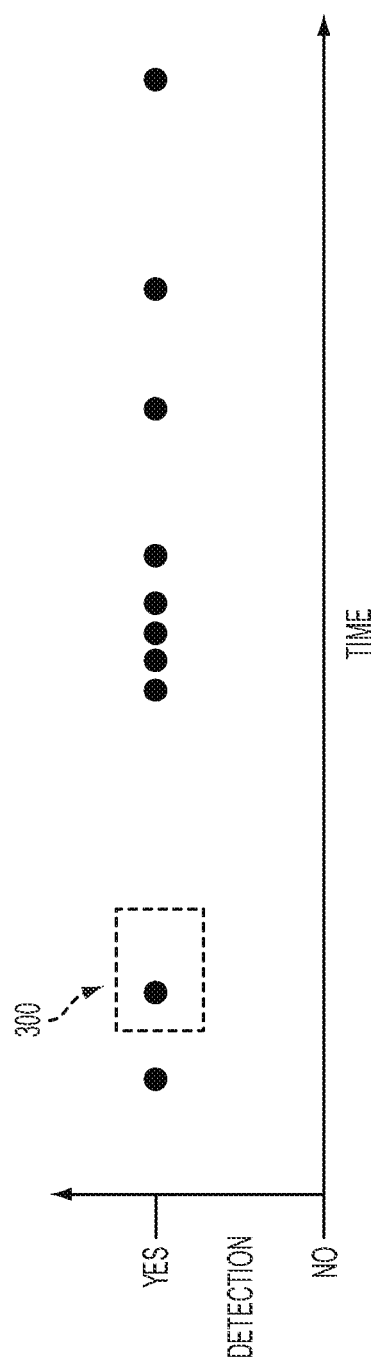

Referring to FIGS. 12A-D, a detection algorithm of electronic controller 132 is represented. Referring to FIG. 12A, a window 300 is represented. Window 300 represents an array of sensor values stored in a memory accessible by controller 132. The following description is based on a single sensor for a respective treatment region 120. In one embodiment, controller 132 performs the same analysis for each sensor of a respective treatment region 120 and also for the remaining treatment regions 120.

Controller 132 samples or otherwise receives output from the sensor 130 and determines whether an object is present along the line of sight of the sensor. In one embodiment, controller samples sensor 130 every thousandth of a second. In one embodiment, for each sample, controller 132 compares the received optical energy to a threshold amount and classifies the sample as one of YES (indicating the presence of an object) and NO (indicating the absence of an object).

Referring to FIG. 12A, the classification for a plurality of sampled values is illustrated (circles are shown only for the YES classified samples) for a length of time. The detection is changing over time because vehicle 102 is moving; thereby moving application apparatus 110. Electronic controller 132 does not store the classification values for sensor 130 indefinitely. Rather, controller 132 is interested in the sensor values which relate to the object that may or may not be present in the treatment region 120. This is why electronic controller 132 retains only a subset of the classification values, represented by window 300. In one embodiment, electronic controller 132 starts with an empty array when a user input is selected to activate the treatment process. As classification values are received the array is filled. Once the array is full, the earliest value is deleted and the next value is added in the array in chronological order.

In one embodiment, electronic controller 132 analyzes the values in window 300 to classify the type of object within treatment regions 120. In one application, an operator may want to spray brush or other woody stem plants, illustrative targeted plants, with an application liquid while tall grasses are not sprayed. Tall grasses will result in YES classifications of at least some sensor samples.

Figure 12B:
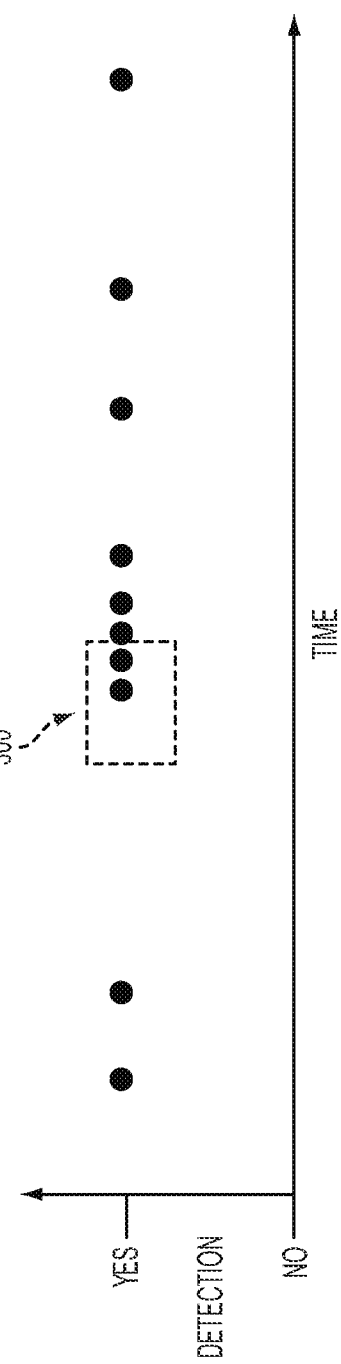

In one embodiment, to discriminate between grasses and brush, electronic controller 132 looks to see if the number of YES classifications in window 300 exceeds a threshold amount. This provides an indication of a longitudinal width of the object. The longitudinal width of the object being one example of a predetermined criteria for treatment. The object being classified as a plant for treatment when the longitudinal width exceeds a certain amount. In one embodiment, a condition for determining if the longitudinal width is indicative of a woody stem plant is if the number of YES sensor readings exceeds a threshold. A woody stem plant should result in a series of YES classifications which is longer than for tall grasses. In one example, the sampling rate is 1000 samples per second and window 300 stores 100 values (0.1 seconds). For this example, electronic controller 132 uses a YES classification threshold of about 35 percent (at or above 35 percent indicates a woody plant). In FIGS. 12A-D, window 300 illustratively includes four samples. In FIG. 12A, window 300 includes one YES classification (25 percent). At that point controller 132 classifies the object as not a woody stem plant. In FIG. 12B, window 300 includes two YES classifications (50 percent). At that point controller 132 classifies the object as a woody stem plant. In FIG. 12C, window 300 includes three YES classifications (75 percent). At that point controller 132 classifies the object as a woody stem plant. In FIG. 12D, window 300 includes one YES classifications (25 percent). At that point controller 132 classifies the object as not a woody stem plant.

In one embodiment, electronic controller 132 based on the sensor samples from at least two of the sensors are used to determine the shape or other characteristic of the plant being detected.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. An apparatus for selectively treating plants comprising:
   a frame arranged to provide a plurality of horizontally spaced apart, non-overlapping treatment regions sized and configured to receive a plant to be treated, the frame separating the plurality of horizontally spaced apart, non-overlapping treatment regions;
   a plurality of sensors supported by the frame, each treatment region including at least one sensor which is arranged to monitor the respective treatment region for a targeted plant to be treated, each of the plurality of sensors producing an output indicative of the presence or absence of an object in the respective treatment region;
   a fluid delivery system including a plurality of application devices, each treatment region including at least one application device; and
   an electronic controller operatively coupled to the plurality of sensors and operatively coupled to the fluid delivery system, the electronic controller configured to receive the respective outputs of the plurality of sensors at a sampling rate over a time interval to create a plurality of historical sensor readings, the electronic controller configured to determine a longitudinal width of the object in the respective treatment region from the plurality of historical sensor readings and classify the object within the respective treatment region as the targeted plant or a non-targeted plant based on the longitudinal width of the object, such that for each treatment region the electronic controller controls the fluid delivery system to deliver an application fluid through the respective application device when the targeted plant is detected in the respective treatment region.

2. The apparatus of claim 1, wherein a first frame portion divides a first treatment region of the plurality of treatment regions from a second treatment region of the plurality of treatment regions and a second frame portion divides the second treatment region from a third treatment region.

3. The apparatus of claim 2, wherein the first treatment region includes a first application device and the second treatment region includes a second application device, the first frame member and the second frame member being arranged to prevent application fluid which is delivered through the second application device from entering the first treatment region and the third treatment region.

4. The apparatus of claim 1, wherein the electronic controller includes a detection algorithm which evaluates the historical sensor readings related to the respective treatment region and classifies the object within the respective treatment region as the targeted plant if at least a threshold number of the historical sensor readings of the respective treatment region are indicative of the presence of the object, the electronic controller configured to classify the object within the respective treatment region as a non-targeted plant if less than the threshold number of the historical sensor readings of the respective treatment region are indicative of the presence of the object.

5. The apparatus of claim 1, wherein the plurality of application devices are spray nozzles.

6. The apparatus of claim 1, wherein the frame includes a plurality of frame members which define a base frame, a first door supported by the base frame and bounding a first side of a first treatment region, a second door supported by the base frame and bounding a side of the first treatment region, the first treatment region being bounded by the base frame, first door, and second door.

7. The apparatus of claim 6, wherein the first door includes a first door aperture through which a first sensor monitors the first treatment region.

8. The apparatus of claim 7, wherein the first door includes a first side and a second side, the apparatus further comprising a positive pressure system providing a flow of fluid which passes from a first side of the first door through the first door aperture to the second side of first door to reduce the entrance of particulate matter through the first door aperture.

9. The apparatus of claim 1, wherein the application fluid is a liquid.

10. The apparatus of claim 1, wherein each treatment region includes at least two application devices, a first application device positioned lower than the second application device such that the first application device targets a base portion of the targeted plant and the second application device targets a leafy portion of the targeted plant.

11. The apparatus of claim 10, further comprising an operator interface providing an indication when the targeted plant is detected in the respective treatment region.

12. The apparatus of claim 11, wherein the operator interface includes at least one input, based on the at least one input the electronic controller activates one of the first application device of the respective treatment region, the second application device of the respective treatment region, and both the first application device of the respective treatment region and the second application device of the respective treatment region when the targeted plant is detected in the respective treatment region.

13. The apparatus of claim 11, wherein the operator interface includes a first input which causes the electronic controller to control the fluid delivery system to deliver the application fluid through the plurality of application devices.

14. The apparatus of claim 8, wherein the positive pressure system is fluidly independent of the fluid delivery system.

15. The apparatus of claim 14, wherein:
the fluid delivery system includes a first fluid conduit for delivery of the application fluid to the targeted plant; and
the positive pressure system includes a second fluid conduit for delivery of the flow of fluid to the housing, the first fluid conduit fluidly separated from the second fluid conduit.

16. The apparatus of claim 8, wherein the flow of fluid of the positive pressure system is a gas and the application fluid of the fluid delivery system is a liquid.

17. The apparatus of claim 1, wherein the electronic controller samples the sensor at the sampling rate over the time interval to create the historical data set representative of a predetermined time window.

18. The method of claim 17, wherein:
the electronic controller determines a number of positive sensor readings and a number of negative sensor readings within the predetermined time window;
the electronic controller compares the number of positive sensor readings to the number of negative sensor readings to determine a percentage of positive readings; and
the electronic controller compares the percentage of positive readings to a threshold percentage indicative of the presence of the targeted plant.

19. The apparatus of claim 1, wherein the apparatus comprises a vehicle having a front, a back and an operator cab between the front and the back, the frame coupled to the front of the vehicle whereby the vehicle can advance the treatment regions along a forward driving direction over the woody stem plants.

20. The apparatus of claim 19, wherein the front of the vehicle has moveable arms, the frame coupled to the moveable arms at the front of the vehicle.

21. The apparatus of claim 1, further comprising a vehicle having a front, a back and an operator cab between the front and the back, wherein:
the frame, the fluid delivery system, and the electronic controller are all integrated into and moveable with the vehicle.

22. A method for selectively treating targeted plants, the method comprising the steps of:
advancing a plurality of horizontally spaced apart, non-overlapping treatment regions in a predetermined direction, each treatment region bounded by at least two frame members of a frame;
activating at least a first sensor supported by the frame such that the sensor monitors the treatment region for the presence or absence of a plant;
causing the plant to enter one of the plurality of treatment regions;
detecting the presence or absence of the plant within the treatment region with at least the first sensor supported by the frame by sampling an output of the sensor at a sampling rate over a regular time interval to create a plurality of historical sensor readings, each sensor reading corresponding to a respective time value; and
classifying each of the plurality of historical sensor readings for the first sensor as either indicative of the presence of an object or indicative of the absence of the object, and determining whether a threshold number of the sensor readings are classified as indicative of the presence of the object within the treatment region;
if the threshold number of readings are classified as indicative of the presence of the object, determining that the plant further satisfies a predetermined criteria for treatment; and
if the plant satisfies the predetermined criteria for treatment, spraying the plant with an application fluid through at least one application device supported by the frame while the plant is within the treatment region.

23. The method of claim 22, wherein the predetermined criteria is whether a width of the plant exceeds a threshold value.

24. The method of claim 22, wherein the predetermined criteria is whether a height of the plant exceeds a threshold value.

25. The method of claim 22, wherein the step of detecting comprises:
   analyzing signals received from the first sensor; and
   classifying the plant based on the analyzed signals as a targeted plant or a non-targeted plant, the predetermined criteria for treatment comprising classification of the plant as a targeted plant.

26. The method of claim 22, wherein the step of detecting comprises:
   determining a number of positive sensor readings and a number of negative sensor readings within a predetermined time window;
   comparing the number of positive sensor readings to the number of negative sensor readings to determine a percentage of positive readings; and
   comparing the percentage of positive readings to a threshold indicative of the presence of the targeted plant.

27. The method of claim 22, wherein the steps of detecting, classifying and spraying are all conducted substantially contemporaneously while the plant is in the treatment region.

* * * * *